(12) United States Patent
Sandelius (10) Patent No.: US 7,997,606 B1
(45) Date of Patent: Aug. 16, 2011

(54) TRAILER HITCH ADAPTER AND MOTORCYCLE CARRIER

(76) Inventor: Edward E. Sandelius, Silver Springs, NV (US)

( * ) Notice: Subject to any disclaimer, the term of this patent is extended or adjusted under 35 U.S.C. 154(b) by 23 days.

(21) Appl. No.: 12/380,848

(22) Filed: Mar. 3, 2009

(51) Int. Cl.
*B62D 53/04* (2006.01)
*B60P 9/00* (2006.01)

(52) U.S. Cl. ........ 280/402; 280/504; 280/511; 414/462; 414/463

(58) Field of Classification Search ................. 280/402, 280/504, 511; 414/462, 463
See application file for complete search history.

(56) References Cited

U.S. PATENT DOCUMENTS

| | | | | |
|---|---|---|---|---|
| 5,366,338 | A | * | 11/1994 | Mortensen ..................... 414/563 |
| 5,984,616 | A | * | 11/1999 | Youmans et al. .............. 414/563 |
| 6,244,813 | B1 | * | 6/2001 | Cataldo .......................... 414/462 |
| 7,188,856 | B2 | * | 3/2007 | Maynard ......................... 280/402 |
| 7,704,034 | B1 | * | 4/2010 | Quigley, III ................... 414/462 |
| 2003/0123964 | A1 | * | 7/2003 | Estes .............................. 414/462 |
| 2006/0062657 | A1 | * | 3/2006 | Davis et al. .................... 414/462 |
| 2007/0024024 | A1 | * | 2/2007 | Maynard ......................... 280/402 |
| 2008/0143077 | A1 | * | 6/2008 | McClellan ...................... 280/402 |
| 2008/0240897 | A1 | * | 10/2008 | Miro et al. ..................... 414/462 |
| 2009/0152830 | A1 | * | 6/2009 | Berry ............................. 280/402 |
| 2010/0038391 | A1 | * | 2/2010 | Cumbie ......................... 224/502 |

* cited by examiner

*Primary Examiner* — Paul N Dickson
*Assistant Examiner* — Marlon A Arce
(74) *Attorney, Agent, or Firm* — John W. Crosby

(57) ABSTRACT

A trailer hitch adapter that elevates the height of a trailer hitch to lower the rear edge of a trailer, thus allowing a safer entry by a motorcycle into the trailer.

4 Claims, 7 Drawing Sheets

TRAILER HITCH ADAPTER AND MOTORCYCLE CARRIER

FIELD

The present invention relates broadly to trailer hitches. Specifically, the present invention relates to a trailer hitch adapter. More specifically, the present invention relates to trailer hitch adapters that facilitate towing of motorcycles.

BACKGROUND

Motorcycles have been enjoyed by the public for decades. In recent years, more and more motorcycles have become popular not simply as means for transportation, but also as recreational vehicles that are used primarily for pleasure. Accordingly, motorcycles have become more and more expensive as their popularity grows, and there is a greater desire to participate in motorcycle shows, club rallies, as well as transporting the motorcycle to repair shops where even more money is spent to customize it.

Transporting a motorcycle typically involves loaded it by ramp into the back of a pickup truck where it is secured for transport. As motorcycles have grown in size and power, the danger of pushing or riding a motorcycle up a ramp into the back of a pickup truck has increased. A fall from a ramp while astride a large motorcycle now can cause serious injury. Motorcycle trailers can reduce this danger, but their cost makes them an unattractive choice, as does the problem of storing a motorcycle trailer when not in use. Even with the trailer, ramps are still necessary and the risk of injury is not completely eliminated. Another problem with transporting motorcycles is that often more than one motorcycle needs to be transported, either by truck or trailer. It is often impossible to transport two ore more motorcycles in the back of a pickup truck due to their size, so a large trailer is often used.

Thus, there remains a heartfelt need to transport motorcycles in a manner that is safer and less costly than by current methods.

SUMMARY OF THE INVENTION

The present invention solves the problems described above by providing a trailer hitch adapter that elevates the height of a trailer hitch to lower the rear edge of a trailer, thus allowing a safer entry by a motorcycle into the trailer.

In one aspect, the present invention provides a trailer hitch adapter that has a base member having a slotted aperture, an upper member, the upper member having a length and being insertable within the base member, an adjustment member having a plurality of apertures arranged in a vertical relationship with each other, the adjustment member attached edgewise with a front side of the upper member and running substantially the length of the upper member, a collar, the collar surrounding an upper end of the base member and having an aperture aligned with the slotted aperture, a first pair of mounting brackets, each of the first pair of mounting brackets mounted in an opposing relation with respect to each other on opposing sides of the slotted aperture, each of the first pair of mounting brackets having an aperture located to receive a securing pin placed through the first pair of mounting brackets to secure the adjustment member therebetween, a tongue disposed in a horizontal orientation, the tongue attached to the bottom of the adjustment member; the tongue having an aperture through which a ball hitch is secured, and a second pair of mounting brackets, each of the second pair of mounting brackets having a plurality of apertures arranged in a vertical relationship with each other, the second pair of mounting brackets attached edgewise with a rear side of the base member in a substantially parallel relationship with each other at a distance sufficient to receive a square hitch therebetween.

In another aspect, the present invention provides a motorcycle carrier, having a first bracket, the first bracket having a horizontal member attached to the tongue and extending for a length, a pair of outside flanges, the outside flanges disposed at opposing ends of the length of the first bracket, each of the outside flanges having an aperture in its center, a pair of side bracket members disposed in a substantially vertical manner and in a parallel relationship with respect to each other, each of the side bracket members attached to on of the pair of outside flanges at apertures located near the top of the side bracket members, a pair of side arm bracket members, the side arm bracket members disposed in a substantially diagonal manner and in a parallel relationship with each other, each side arm bracket member attached to the base member at one end of the side arm bracket member, the side arm bracket member also attached to one of the side bracket members at a point along the length of the side arm bracket member, and a pair of cradle members, the cradle members attached to ends of the side arm bracket members, the cradle members disposed in a substantially horizontal manner and in a parallel relationship with each other at a distance sufficient to receive a motorcycle wheel.

In yet another aspect, the present invention provides a dual motorcycle carrier comprising first and second motorcycle carriers, each of the first and second motorcycle carriers having a first bracket, the first bracket having a horizontal member attached to the tongue and extending for a length, a pair of outside flanges, the outside flanges disposed at opposing ends of the length of the first bracket, each of the outside flanges having an aperture in its center, a pair of side bracket members disposed in a substantially vertical manner and in a parallel relationship with respect to each other, each of the side bracket members attached to on of the pair of outside flanges at apertures located near the top of the side bracket members, a pair of side arm bracket members, the side arm bracket members disposed in a substantially diagonal manner and in a parallel relationship with each other, each side arm bracket member attached to the base member at one end of the side arm bracket member, the side arm bracket member also attached to one of the side bracket members at a point along the length of the side arm bracket member, and a pair of cradle members, the cradle members attached to ends of the side arm bracket members, the cradle members disposed in a substantially horizontal manner and in a parallel relationship with each other at a distance sufficient to receive a motorcycle wheel.

Numerous other features and advantages of the present invention will become apparent from reading the following detailed description, when considered in conjunction with the accompanying drawings, in which:

DETAILED DESCRIPTION

Figure 1:
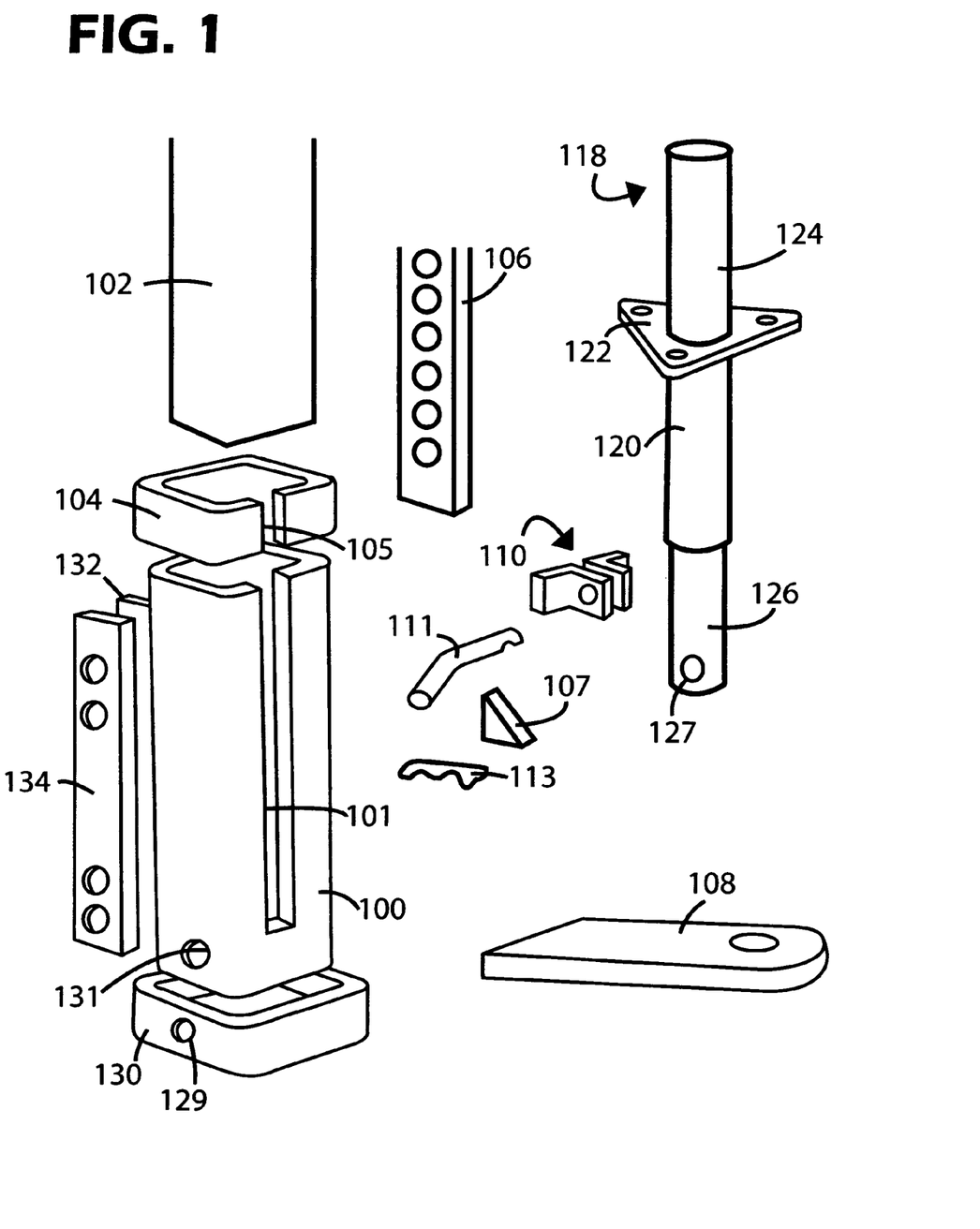
FIG. 1 illustrates an exploded view of an embodiment of the trailer hitch adapter of the present invention.

Directing attention to FIG. 1, there is shown generally an exploded view of an embodiment of the trailer hitch adapter of the present invention. Base member 100 is configured vertically with slotted aperture 101 running longitudinally along the center of the front face. Collar 104 is secured around the outside of the upper end of base member 100 to provide strength and support to base member 100, and also has a slotted aperture 105 dimensioned similar to slotted aperture 101. Upper member 102 is dimensioned to be inserted within base member 100, and has adjustment member 106 affixed edgewise to its front face. Adjustment member 106 includes a series of adjustment holes that allow tongue 108 to be presented at one of a plurality of heights. In an embodiment, triangular brace 107 is included to provide support between adjustment member 106 and tongue 108.

Mounting brackets 110 are, in the preferred embodiment, a pair of right-angle shaped pieces that are affixed to the edges of collar 104 that oppose aperture 105. When upper member 102 is inserted into base member 100, one of the holes of adjustment member 106 aligns with the holes of mounting brackets 110, and securing pin 11 is inserted through these holes. In an embodiment, securing pin 111 is bent at an angle, and, in combination with cotter pin 113, is locked in position to secure upper member 102 within base member 100 to secure adjustment member 106 and tongue 108 at a desired height. Optionally, a mudflap can be included in the present invention. In a preferred embodiment, the mudflap is slotted horizontally so that it fits over tongue 108.

Jack screw 118 is secured within base member 100 and upper member 102 to provide an elevation mechanism to adjust the height of upper member 102 and adjustment member 106 so that different holes on adjustment member 106. In an embodiment, jack screw 118 includes lower jack screw member 120, upper jack screw member 124, union brackets 122 and inner jack screw member 126. Union brackets 122 include two plates, each affixed to either upper jack screw member 124 or lower jack screw member 120. Inner jack screw member 126, in an embodiment, includes through-hole 127. By inserting a threaded bolt into through-hole 129 of base cap 130, then into through-hole 131, and then into through-hole 127, and placing a threaded nut on the portion of the threaded bolt exposed on the opposite side, jack screw 118 can be secured within base member 100 and upper member 102.

On the rear side of base member 100, mounting brackets 132, 134 can be affixed in a substantially parallel relationship with respect to each other on the rear face of base member 100. Directing attention to FIG. 2, mounting brackets 132, 134 can be secured to base member also by adding fastener plate 140 to the side surfaces of base member 100 and mounting brackets 132, 134. Square member 144 can be fasted between mounting brackets 132, 134 to fasten the entire apparatus to a square hitch (not shown) that is commonly found on vehicles used to tow trailers and other vehicles.

Figure 2:
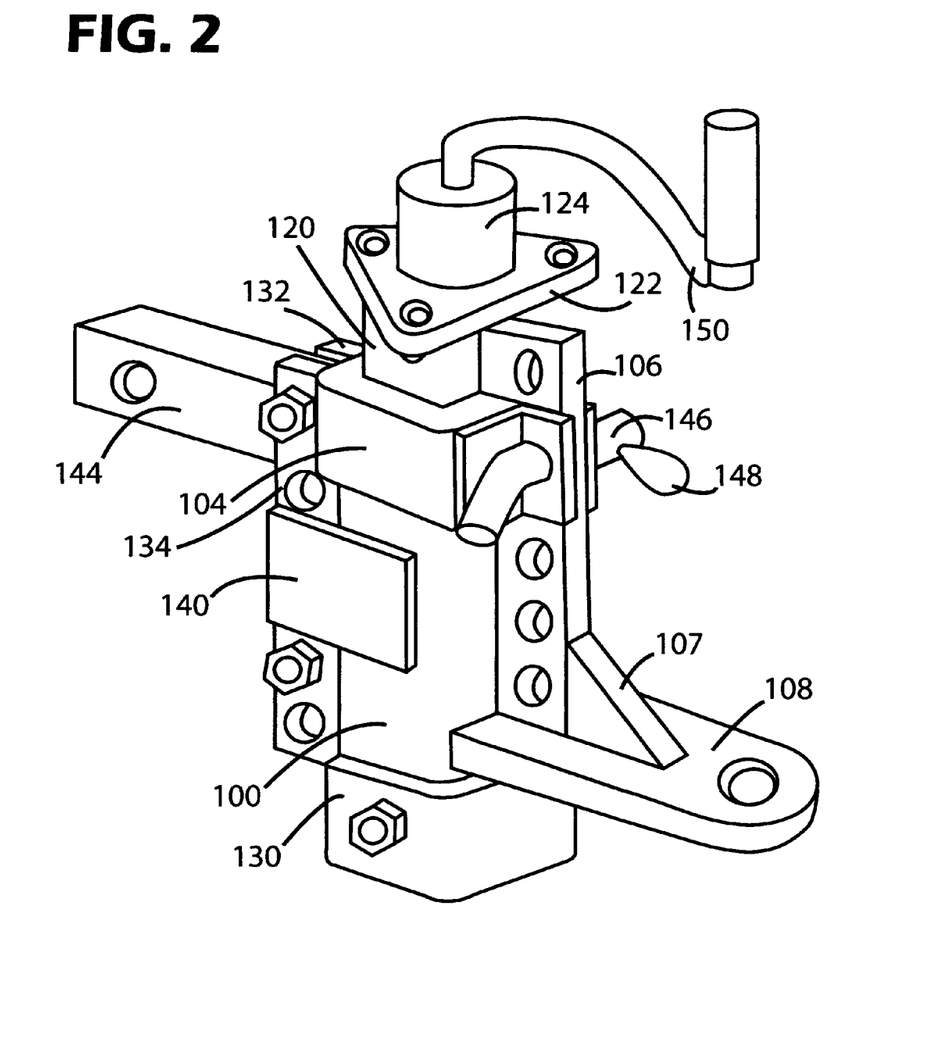
FIG. 2 illustrates the trailer hitch adapter shown in FIG. 1 in assembled form.
Figure 3:
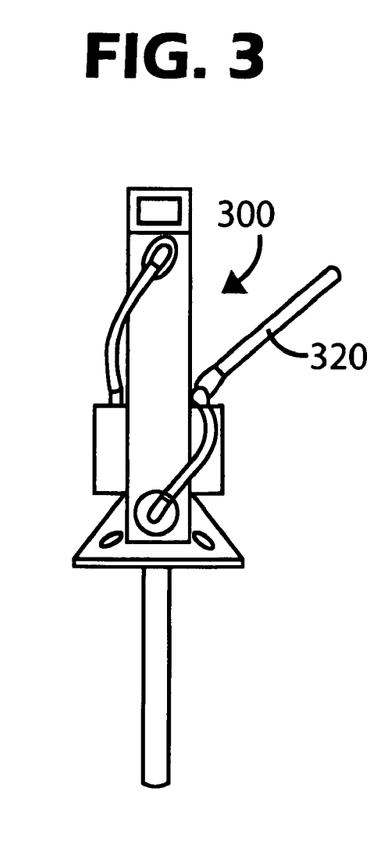
FIG. 3 illustrates a hydraulic pump assembly for elevating the trailer hitch adapter shown in FIGS. 1 and 2.
Figure 4A:
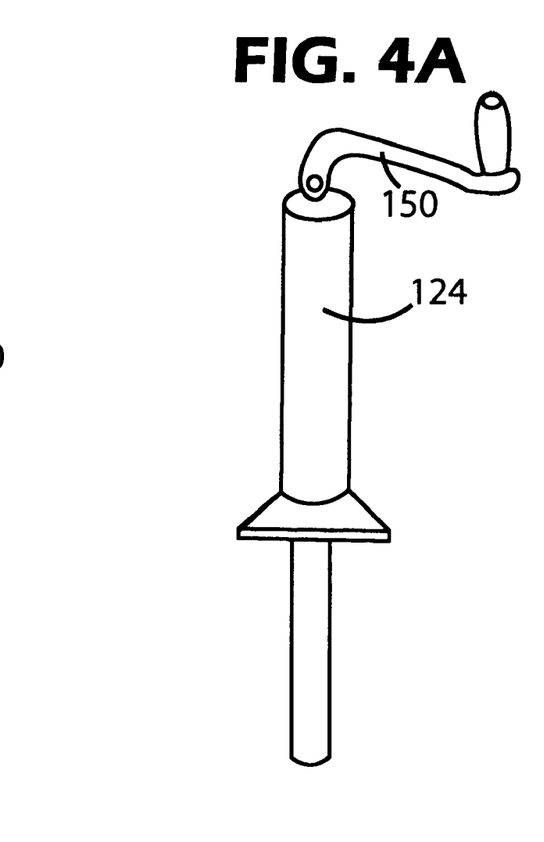
FIG. 4A illustrates the jackscrew of the trailer hitch adapter shown in FIG. 1 coupled to a hand crank.
Figure 4B:
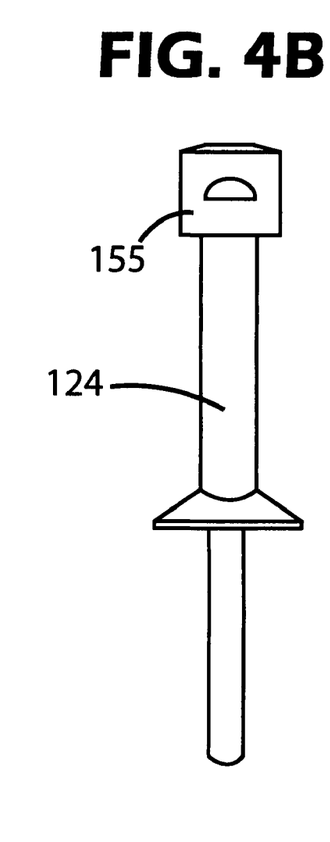
FIG. 4B illustrates the jackscrew of the trailer hitch adapter shown in FIG. 1 coupled to an electronic controller.

As shown in FIG. 2 and FIG. 4A, jack screw 118 can utilize crank handle 150. However, in place of crank handle 150, electronic control unit 155 can be placed atop upper jack screw member 124 to provide a powered operation of jack screw 118. In yet another embodiment, jack screw 118 can be replaced by hydraulic unit 300 illustrated in FIG. 3, Hydraulic unit 300 includes pump handle 320, that can be operated in a vertical movement to elevate or lower adjustment member 106 and tongue 118.

Figure 5:
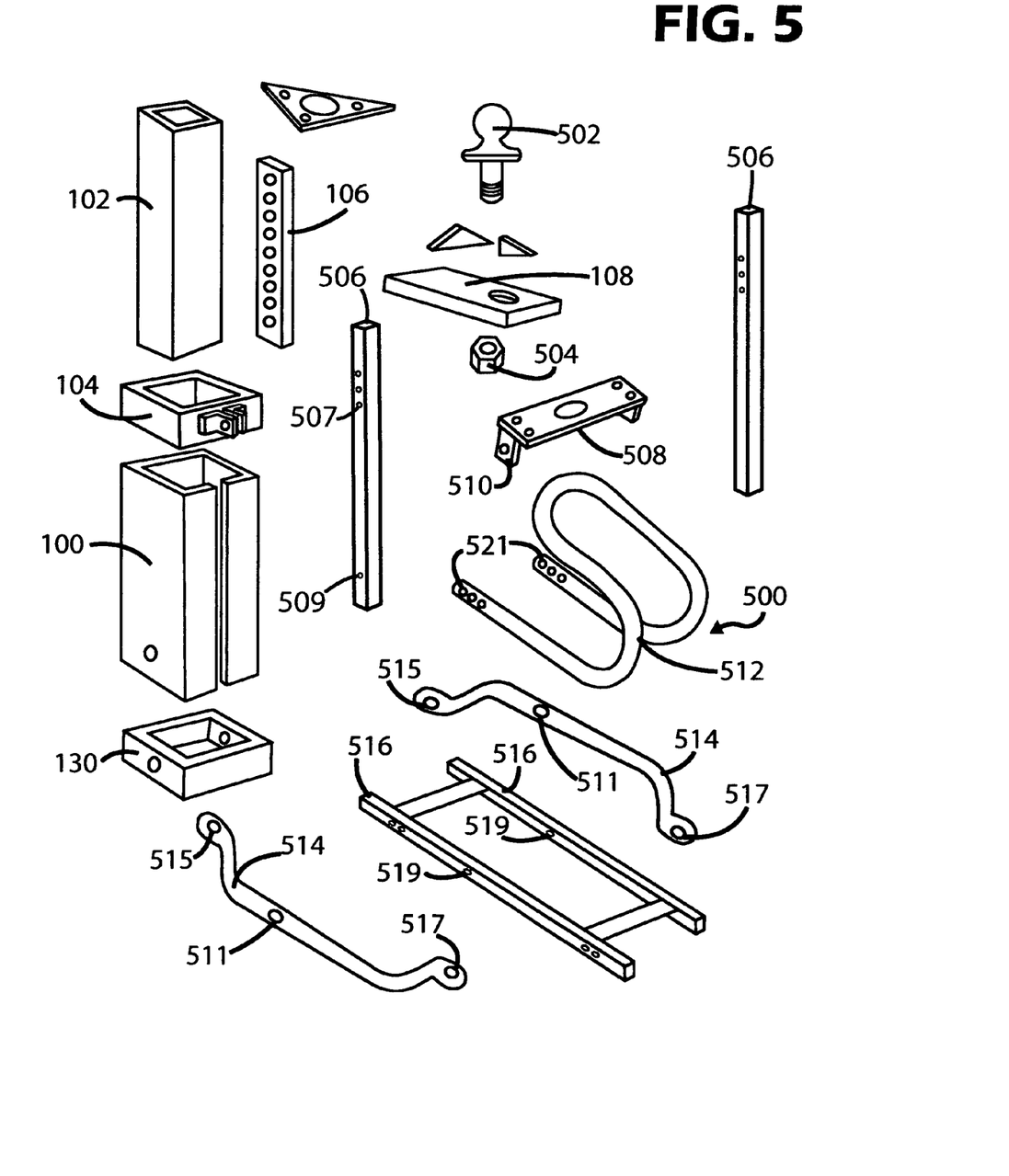
FIG. 5 illustrates an exploded view of the trailer hitch adapter shown in FIG. 1 with a receiver that carries the front wheel of a motorcycle.
Figure 6A:
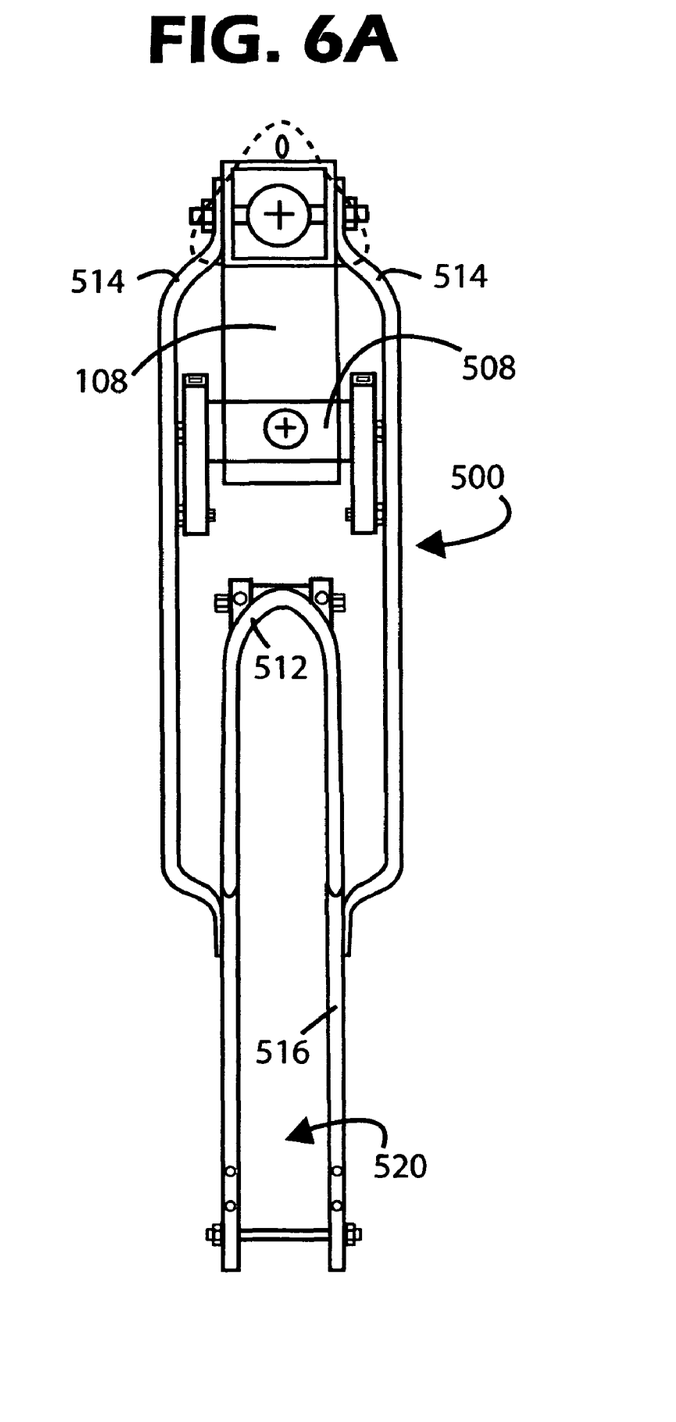
FIG. 6A illustrates a plan view of the receiver that carries the front wheel of a motorcycle.
Figure 6B:
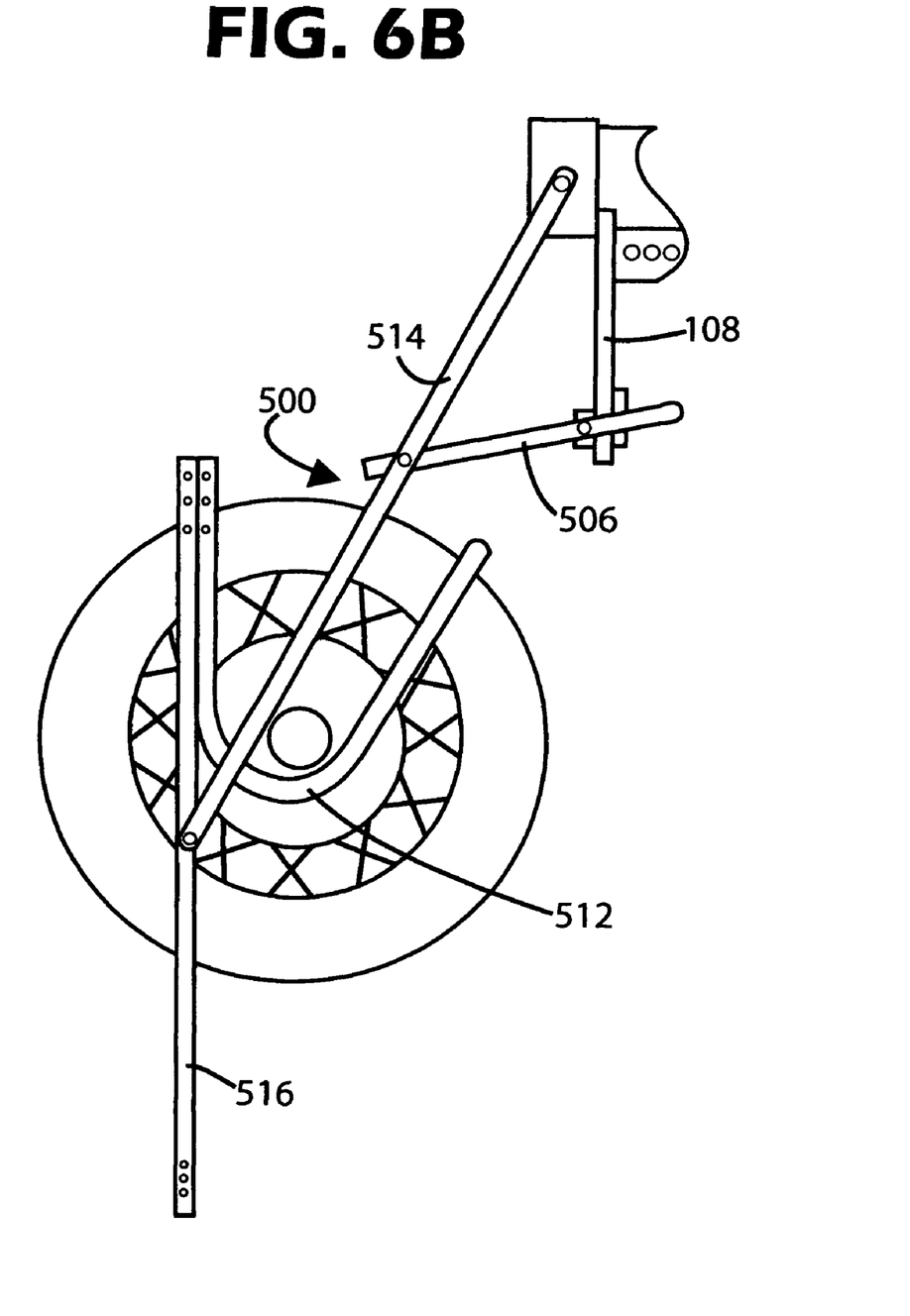
FIG. 6B illustrates an elevation view of the receiver that carries the front wheel of a motorcycle.

Directing attention to FIGS. 5, 6A and 6B, in another aspect, the present invention provides motorcycle carrier 500. Ball hitch 502 is inserted through tongue 108 and secured by nut 504 or other suitable fastener. While nut 504 is shown above bracket 508, this is for visibility in FIG. 5, and it is to be understood that bracket 508 is placed in contact with tongue 108 such that bracket 508 is secured to tongue 108 by the insertion of ball hitch 500 through both tongue 108 and bracket 508, then nut 504 is fastened to ball hitch 502. Side bracket members 506 are oblong, straight pieces that fasten to the outside flanges 510 on bracket 508, and, in an embodiment, include a plurality of fastening apertures 507 that allow different mounting points along the length of side bracket members 506. Also present at the bottom of side bracket member 506 is a pivot aperture 509. Side bracket member 506 fastens to aperture 511 located along the length of side arm bracket member 514. Side arm bracket members 514 fasten to base cap 130 through aperture 515, and to cradle members 516 at aperture 517. Cradle members 516 attach to side arm bracket member 514 at aperture 519, located along the length of cradle member 516. Receiver 512 is a curved member that fastens to cradle members 516 and may also include a plurality of apertures 521.

FIGS. 6A and 6B show a plan view and elevation view, respectively, of carrier 500 attached to trailer hitch adapter 100. Directing attention to FIG. 6A, the front wheel of a motorcycle is placed within space 520, defined herein as the space between cradle members 516. No lifting of the motorcycle is required. Once the motorcycle wheel is placed within space 520, the motorcycle can be secured to receiver 512 by tying, strapping, or chaining the motorcycle wheel to one or more of apertures 521.

Figure 7:
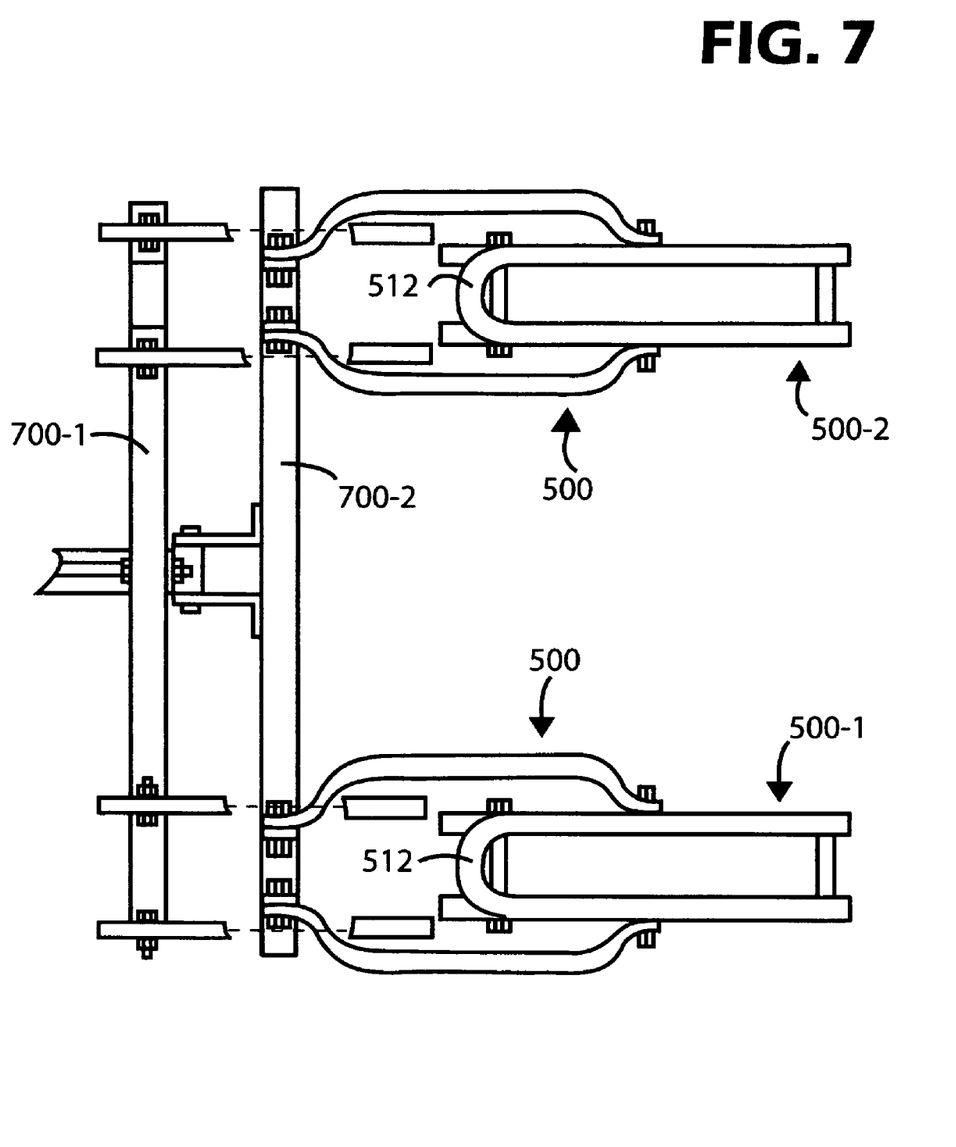
FIG. 7 illustrates a plan view of a double receiver that carries the front wheels of two motorcycles.

FIG. 7 illustrates an embodiment of the present invention incorporating dual, side by side motorcycle carriers 500. In this embodiment, horizontal bar members 700-1 and 700-2 are disposed between motorcycle carriers 500-1 and 500-2. One of horizontal bar members 700 can fasten to tongue 108 to allow two motorcycles to be towed behind a vehicle with no lifting of either motorcycle in the manner described above with reference to FIGS. 5, 6A and 6B.

While numerous modifications can be made to embodiments of the present invention without departing from the spirit thereof, it is to be understood that such modifications in no way limit the present invention.

What is claimed is:

1. A motorcycle carrier, comprising:
 a first bracket, said first bracket having a horizontal member attached to a tongue and extending for a length;
 a pair of outside flanges, said outside flanges disposed at opposing ends of the length of said first bracket, each of said outside flanges having an aperture in its center;
 a pair of side bracket members disposed in a substantially vertical manner and in a parallel relationship with respect to each other, each of said side bracket members attached to one of the pair of outside flanges at apertures located near the top of said side bracket members;

a pair of side arm bracket members, said side arm bracket members disposed in a substantially diagonal manner and in a parallel relationship with each other, each side arm bracket member attached to a base member at one end of the side arm bracket member, said side arm bracket member also attached to one of said side bracket members at a point along the length of said side arm bracket member; and a pair of cradle members, said cradle members attached to ends of said side arm bracket members, said cradle members disposed in a substantially horizontal manner and in a parallel relationship with each other at a distance sufficient to receive a motorcycle wheel, wherein said receiver member comprises first and second pluralities of apertures, each of said pluralities of apertures located above said cradle members and providing a tie point to which a motorcycle wheel is secured.

2. The motorcycle carrier of claim 1, wherein said side bracket members have a plurality of apertures along its length, each of said apertures in the plurality providing a mounting point for said side bracket to attach to said outside flange.

3. A dual motorcycle carrier, comprising first and second motorcycle carriers, each of the first and second motorcycle carriers having:
  a first bracket, said first bracket having a horizontal member attached to said tongue and extending for a length;
  a pair of outside flanges, said outside flanges disposed at opposing ends of the length of said first bracket, each of said outside flanges having an aperture in its center;
  a pair of side bracket members disposed in a substantially vertical manner and in a parallel relationship with respect to each other, each of said side bracket members attached to one of the pair of outside flanges at apertures located near the top of said side bracket members;
  a pair of side arm bracket members, said side arm bracket members disposed in a substantially diagonal manner and in a parallel relationship with each other, each side arm bracket member attached to a base member at one end of the side arm bracket member, said side arm bracket member also attached to one of said side bracket members at a point along the length of said side arm bracket member; and
  a pair of cradle members, said cradle members attached to ends of said side arm bracket members, said cradle members disposed in a substantially horizontal manner and in a parallel relationship with each other at a distance sufficient to receive a motorcycle wheel, wherein said receiver member comprises first and second pluralities of apertures, each of said pluralities of apertures located above said cradle members and providing a tie point to which a motorcycle wheel is secured.

4. The dual motorcycle carrier of claim 3, wherein said side bracket members have a plurality of apertures along its length, each of said apertures in the plurality providing a mounting point for said side bracket to attach to said outside flange.

* * * * *